Aug. 31, 1937.   A. C. LEIGH   2,091,784
COLLISION BULKHEAD CONSTRUCTION FOR WELDED BARGES
Filed March 21, 1936
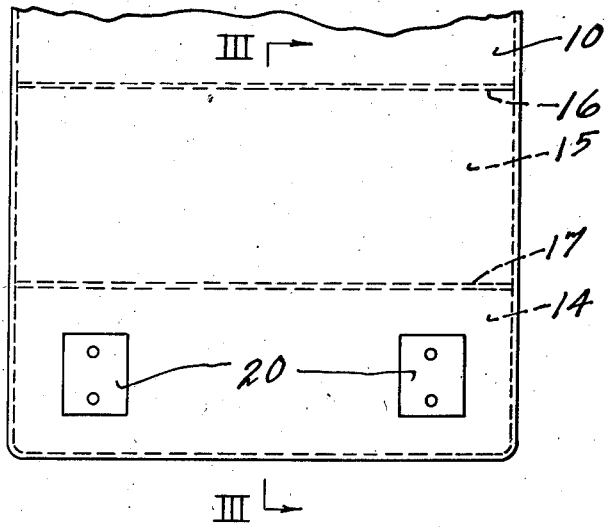
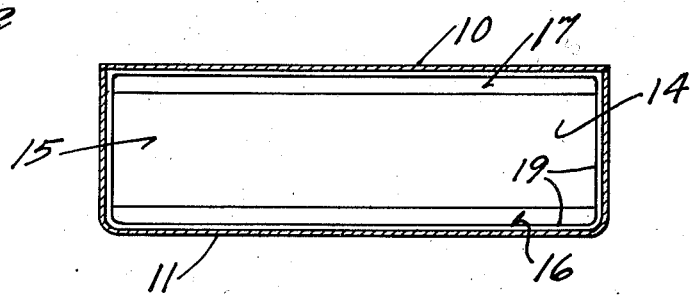
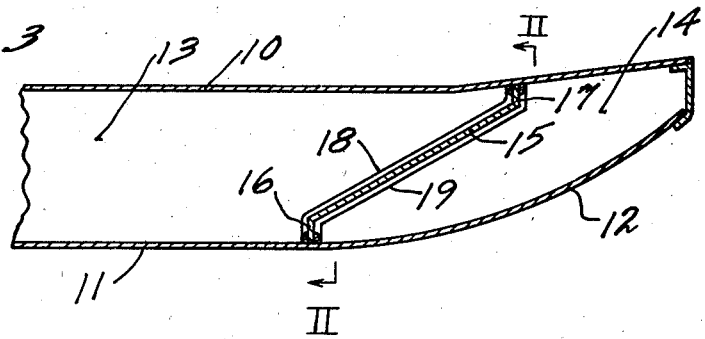
INVENTOR
Alfred C. Leigh
BY
ATTORNEYS Patented Aug. 31, 1937

2,091,784

UNITED STATES PATENT OFFICE 2,091,784

COLLISION BULKHEAD CONSTRUCTION FOR WELDED BARGES

Alfred C. Leigh, Birmingham, Ala., assignor to Ingalls Iron Works Company, a corporation of Delaware Application March 21, 1936, Serial No. 70,104

3 Claims. (Cl. 114—78)

My invention relates to a novel design of collision bulkheads for use in welded steel barges, which is of particular value in the case of tank barges adapted for the carrying of low specific gravity liquids such as gasoline and light hydrocarbon oils.

It is well established practice, in the building of metal barges, to provide collision bulkheads the position of which is indicated by the tangent of the rake curve and which generally are vertically disposed and riveted or welded to the deck, bottom and side plates to provide water-tight joints.

In order to increase the cargo space between these collision bulkheads, it has been the practice, in the construction of riveted steel barges for coal and like bulk material, to incline these collision bulkheads, it being quite practical, by the use of flanges or angles and water-tight caulking of the rivets, to join such inclined bulkheads to the bottom and deck plates with an effective leak-proof joint.

No practical way, however, has been devised heretofore to use these inclined collision bulkheads where the barge is of welded construction, due to the fact that it is considered essential to apply the weld on both sides of the joint, and where the bulkhead is sharply inclined space is not allowed on the small angle side for the men to apply the weld. If the bulkhead be not sharply inclined there is no particular gain of a cargo space and the principal advantage of the inclined collision bulkhead is lost. While the use of the inclined bulkhead is of value for all types of cargoes, it is particularly desirable in the case of tank barges designed to carry the lighter hydrocarbon oils such as gasoline and light petroleum products. Such tank barges with standard collision bulkhead construction designed for heavier fluids, will not have sufficient cargo space for these lighter fluids to utilize the full displacement of the barge, because the increased cargo space thereby afforded will for the same length of barge afford sufficient space to store enough of the lighter fluid to utilize the full displacement of the barge. To illustrate the increase in cargo space thus obtained at practically no increase in cost and without effecting the safety factors, it may be stated that in a barge having an eight foot depth, the provision of a collision bulkhead set at a 45° angle will increase its cargo space to the same extent as if the length of the barge were increased eight feet over all.

The principal object of my invention is to provide a special type of collision bulkhead which will obtain the maximum increase in the cargo space and at the same time be readily adapted to be welded to position on both sides with a safely leak-proof joint.

More particularly, my invention contemplates the provision of a Z-type inclined collision bulkhead for welded metal barge construction, the ends of the bulkhead being disposed normal to the deck and bottom plating of the boat so as to provide a 90° angle on both sides and made only long enough to permit ready access to the joint from both sides for the application of the weld on both sides of the bulkhead plate.

I have illustrated in the accompanying drawing which forms a part of this specification, application of my invention to a standard tank barge of weld construction;

Fig. 1 showing in a fragmental plan view one end of the barge;

Fig. 2 showing a transverse cross sectional view taken on the line II—II of Fig. 3; and Fig. 3 showing a longitudinal cross-sectional view taken on the line III—III of Fig. 1.

Similar reference numerals refer to similar parts throughout the drawing.

In the embodiment of my invention illustrated, I show conventionally a steel barge having deck plating 10, a bottom plate 11, a rake 12, cargo tank 13, a peak compartment 14, and my special design of collision bulkhead 15 separating the peak compartment from the main tank space in the barge.

This collision bulkhead is of Z-construction having its main body portion inclined and terminating top and bottom in short ends 16 and 17 which are parallel and adapted to be joined at right angles to the top and bottom plating of the barge by welding. The deposit of welding is laid on both sides of the joints not only with the top and bottom but entirely surrounding the bulkhead to make them oil and water tight. It is the customary practice to lay a heavy bead of welding on one side for purposes of strength, such for instance as the bead 18, and if desired for economical reasons a lighter bead of welding 19 can be applied on the opposite side to anneal the opposite bead and to provide double assurance against leakage. I have shown both beads of substantially equal thickness, but if desired either weld may be made the lighter bead.

The bulkhead is so inclined and designed as to materially increase the capacity of the cargo or tank compartment 13 and yet to leave the requisite space in the peak compartment so that access may be had thereinto through the manholes 20 to apply the inner weld 19 across the bottom of the bulkhead plate and to make needed repairs from within the peak compartment.

In like manner, the short angled end 17 is made just long enough to provide the requisite space to apply the outer weld 18 across the top of the bulkhead plate. By forming these angled ends 16 and 17 of a length just sufficient to afford access for the application of the weld on the small angled side of the bulkhead plate, I preserve all of the advantages of the welding construction without material sacrifice of the maximum increase available for the main cargo space. It is to be borne in mind that a collision bulkhead must enter at the tangent formed by the bottom plate with the rake curve and its inclination should be as great as will allow the access space above pointed out in the bulkhead compartments 14.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. A welded steel barge for the transportation of low specific gravity fluids, having a main storage compartment and peak compartments defined by collision bulkheads welded in position on both sides of its joints with the barge walls, the main body portion of each bulkhead lying in a plane inclined at an angle of approximately 45° to the horizontal and having angled ends normal to the top and bottom of the boat and just long enough to provide welding access to the top and bottom bulkhead joints from the side of each end which faces towards the inclined body portion of the bulkhead.

2. In a metallic barge of welded steel construction, having deck and bottom plating with easy rakes to reduce towing resistance, inclined end plates forming elongated shallow end collision bulkhead chambers, said plates having their upper and lower ends oppositely bent into substantially vertical position to form short flanges adapted to be welded on both sides to the deck and bottom plating, said angled flanges having substantially only that length necessary to afford access for the application of the weld on the side of the plate forming the small angle with the adjacent deck or bottom plate.

3. A metallic barge designed for liquid cargo, having easy rakes to reduce towing resistance and elongated inclined peak bulkheads welded in place on both sides to form oil and water tight shallow collision compartments overlying said rakes, said bulkheads being formed by flat plates sharply inclined and having sufficient of their top and bottom ends bent reversely into substantially vertical position to form short flanges just long enough to afford access on each side of the plate ends for welding.

ALFRED C. LEIGH.